(12) United States Patent
Hammer et al.

(10) Patent No.: US 11,612,955 B2
(45) Date of Patent: Mar. 28, 2023

(54) JOINING DEVICE AND JOINING METHOD

(71) Applicants: VOLKSWAGEN AKTIENGESELLSCHAFT, Wolfsburg (DE); IPG Laser GmbH, Burbach (DE)

(72) Inventors: Thorge Hammer, Tappenbeck (DE); Wilfried Reimann, Oerlinghausen (DE); Eugene Shcherbakov, Burbach (DE)

(73) Assignees: Volkswagen Aktiengesellschaft, Wolfsburg (DE); IPG Laser GmbH, Burbach (DE)

( * ) Notice: Subject to any disclaimer, the term of this patent is extended or adjusted under 35 U.S.C. 154(b) by 291 days.

(21) Appl. No.: 17/120,542

(22) Filed: Dec. 14, 2020

(65) Prior Publication Data

US 2021/0094119 A1 Apr. 1, 2021

Related U.S. Application Data

(63) Continuation of application No. 15/790,650, filed on Oct. 23, 2017, now Pat. No. 10,894,300, which is a (Continued)

(30) Foreign Application Priority Data

Apr. 22, 2015 (DE) .................... 10 2015 207 279.7

(51) Int. Cl.
*B23K 26/06* (2014.01)
*B23K 1/005* (2006.01)
(Continued)

(52) U.S. Cl.
CPC ........ *B23K 26/0608* (2013.01); *B23K 1/0056* (2013.01); *B23K 1/20* (2013.01);
(Continued)

(58) Field of Classification Search
CPC ...... B23K 1/0056; B23K 1/20; B23K 26/361; B23K 26/354; B23K 26/0608;
(Continued)

(56) References Cited

U.S. PATENT DOCUMENTS

| 7,807,939 | B2* | 10/2010 | Nagashima | ........ B23K 26/0604 |
| | | | | 219/121.64 |
| 8,378,257 | B2* | 2/2013 | Nomaru | ............... B23K 26/364 |
| | | | | 219/121.75 |
| 2016/0114427 | A1* | 4/2016 | Eibl | ..................... B29C 64/153 |
| | | | | 219/76.12 |

* cited by examiner

*Primary Examiner* — Brian W Jennison
(74) *Attorney, Agent, or Firm* — Caroline J. Roush, Esq.

(57) ABSTRACT

A joining device and method for laser-based joining of two components includes a first laser radiation source, a first radiation guide connected to the first radiation source to couple first laser radiation into the first radiation guide, a second laser radiation source, at least one second radiation guide connected to the second radiation source to couple second laser radiation into the second radiation guide, and a focusing device coupled to the laser radiations and focusing them at a distance from each other into a joining zone of the components. To reduce installation effort, the focusing device focuses the first and second laser radiations through a common beam path and a coupling device is connected on its input side to the first and second radiation guides and on its output side to the focusing device. The coupling device couples the first and second laser radiations into the common beam path.

11 Claims, 2 Drawing Sheets

Related U.S. Application Data continuation of application No. PCT/EP2016/055944, filed on Mar. 18, 2016.

(51) Int. Cl.
| | |
|---|---|
| *B23K 1/20* | (2006.01) |
| *B23K 26/24* | (2014.01) |
| *B23K 26/354* | (2014.01) |
| *B23K 26/361* | (2014.01) |
| *B23K 101/34* | (2006.01) |
| *B23K 103/08* | (2006.01) |

(52) U.S. Cl.
CPC .......... *B23K 26/0604* (2013.01); *B23K 26/24* (2013.01); *B23K 26/354* (2015.10); *B23K 26/361* (2015.10); *B23K 2101/34* (2018.08); *B23K 2103/08* (2018.08)

(58) Field of Classification Search
CPC ............ B23K 26/0613; B23K 26/0604; B23K 26/046; B23K 26/032; B23K 26/364; B23K 2103/12; B23K 2101/34
See application file for complete search history.

JOINING DEVICE AND JOINING METHOD

CROSS-REFERENCE TO RELATED APPLICATIONS

This application is a divisional application of, and claims priority under 35 U.S.C. § 121 from, U.S. application Ser. No. 15/790,650, filed Oct. 23, 2017, which application is a continuing application, under 35 U.S.C. § 120, of international application No. PCT/EP2016/055944, filed Mar. 18, 2016, which designated the United States and was not published in English; and which application also claims the priority, under 35 U.S.C. § 119, of German patent application No. 10 2015 207 279.7, filed Apr. 22, 2015; the prior applications are herewith incorporated by reference in their entirety.

STATEMENT REGARDING FEDERALLY SPONSORED RESEARCH OR DEVELOPMENT

Not Applicable

FIELD OF THE INVENTION

The present systems, apparatuses, and methods lie in the field of joining components. The present disclosure relates to a joining device and joining method utilizing laser radiation.

BACKGROUND OF THE INVENTION

A joining device and a joining method of the type mentioned above are known, for example, from German Published, Non-Prosecuted Patent Application DE 10 2006 038 422 A1. According to this document, the laser radiation of a first laser radiation source is used to effect material bonding of two components in a joining zone formed by the latter. The laser radiation of a second laser radiation source is used to effect preheating of the two components as a joining pretreatment in the joining zone upstream to or preceding a joining direction of the laser radiation of the first laser radiation source. For this purpose, the first and second laser radiations emitted by separate laser radiation sources are focused into the joining zone by respective focusing devices and optical systems necessitating an increased installation effort.

Thus, a need exists to overcome the problems with the prior art systems, designs, and processes as discussed above.

SUMMARY OF THE INVENTION

The systems, apparatuses, and methods described provide a joining device and joining method that overcome the hereinafore-mentioned disadvantages of the heretofore-known devices and methods of this general type and that provide such features with a reduction in the installation effort.

A joining device is provided for the laser radiation-based joining of at least two components. The joining device comprises a first laser radiation source having a predetermined power configuration, a first radiation guide, a second laser radiation source having a predetermined power configuration, at least one second radiation guide and focusing device.

The first radiation guide is connected to the first laser radiation source in order to couple first radiation emitted from the first laser radiation source into the first radiation guide. The at least one second radiation guide is connected to the second laser radiation source to couple second laser radiation emitted from the second laser radiation source into the at least one second radiation guide. The focusing device is coupled to the first and second radiation guides (preferably to respective radiation outlets thereof) and are configured to focus the first laser radiation and the second laser radiation at a distance from each into a joining zone of the two components.

The joining device is characterized in that the focusing device is configured to focus the first and the second laser radiation through a common beam path, and in that the coupling device is provided and is connected on the input side to the first and second radiation guides (preferably with the respective radiation outlets) and is connected on the output side to the focusing device and is disposed to couple the first and the second laser radiation into the common beam path of the focusing device.

Since the first and the second laser radiation can be focused through a common beam path, there is no need to provide a separate beam path for focusing for each of the two laser radiations and, thus, the installation effort for the joining device is reduced.

In an exemplary embodiment, the focusing device comprises a single optical system for focusing the first and second laser radiations. The optical system defines a single beam path, by which the first and second laser radiations can be jointly guided and can be focused into the joining zone of the two components with multiple spaced-apart foci.

According to an exemplary embodiment, at least one further second radiation guide is provided that is connected to the second laser radiation source to couple the second laser radiation into the at least one further second radiation guide. In this way, the second laser radiation can advantageously be distributed to two working points in the joining zone.

According to a further exemplary embodiment, the coupling device comprises a multi-core fiber with fiber cores, which, in particular, extend parallel to one another and the number of which corresponds to the sum of first and second radiation guides, for guiding radiation. The fiber cores, on one hand, are coupled respectively to one of respective radiation outlets of the first and second radiation guides and, on the other hand, are coupled respectively to the focusing device. In other words, in the multi-core fiber, the first and second radiation guides (optical fibers) are coupled in a common optical fiber cable (the multi-core fiber), which, in turn, is coupled to the focusing device. As an alternative to the optical fiber cable or the multi-core fiber, a corresponding fiber coupler can also be provided, which makes it possible, like the multi-core fiber, to image multiple foci over a single beam path or with a single optical system.

According to yet another exemplary embodiment, the power configuration of the first laser radiation source differs from the power configuration of the second laser radiation source. In an exemplary embodiment, a laser beam power of the first laser radiation source is greater than a laser beam power of the second laser radiation source. By virtue of these differing power configurations of the two laser radiation sources, these laser radiation sources can be advantageously used for different tasks in a joining process using the joining device.

Thus, the power configuration of the first laser radiation source is, in an exemplary embodiment, defined to effect a material bonding of the two components with the focused first laser radiation by heat input. On the other hand, the power configuration of the second laser radiation source is defined to effect surface pretreatment at at least one of the two components in the joining zone as a joining pretreatment with the focused second laser radiation. In particular, the power configuration of the second laser radiation source is defined to effect ablation and/or melting of a coating on at least one of the two components in the joining zone as a joining pretreatment with the focused second laser radiation. The power configuration of the second laser radiation source is defined to effect the joining pretreatment at both components simultaneously with the focused second laser radiation.

In this way, the laser-joining of coated components, such as sheet metal, in particular hot-dip galvanized components, can be advantageously made more reliable. In the case of conventional laser-based joining devices, characteristic defects such as splashes, pores, attachment defects, or a rough weld surface could be observed during the joining of coated components. Particularly in laser soldering of hot-dip galvanized components, a narrowing of the process window and, for example, a wavy edge connection of the soldering seam of the joining zone were observed. The hitherto-missing possibility of producing laser beam joining connections in an esthetically pleasing quality that, for example, is suitable for external parts of motor vehicles, posed an obstacle to the use of hot-dip galvanized components (such as sheet metal) for example in the exterior of motor vehicles.

The joining device, in which an irradiation of the component surface with the second laser radiation for changing the surface properties of the components can be carried out in addition to the actual joining process with material bonding of the components based on the first laser radiation, can advantageously solve the problems existing in laser joining of coated components.

With the joining device, melting and/or selective ablating of the coating (in particular, of a zinc layer surface) of the components in the area of the joining zone is made possible with the second laser radiation. Advantageously, the second laser radiation is focused into the joining zone such that this pretreatment takes place inline and directly preceding the actual joining process with the first laser radiation, whereby the esthetically pleasing quality of the resultant joining seam can be increased.

In addition, as a result of the heat input into the components preceding the first laser radiation, a higher filling volume of solder and a greater bonding length of the solder to the components are achieved, in particular, during laser soldering. Finally, the sensitivity of a laser-based joining process towards disturbance variables such as, for example, fluctuations in the laser power or a component oiling is generally reduced, enabling reliable laser-based joining of hot-dip galvanized or otherwise coated components.

There is also provided a joining method for laser radiation joining at least two components. In an exemplary embodiment, the joining process is implemented or executed using a joining device according to one, several, or all of the exemplary embodiments described herein in any conceivable combination. In order to avoid repetitions, it is stated here that the advantages and variations shown above for the joining device apply to the joining method.

The joining process comprises the steps of: arranging the two components so as to define a joining zone for joining them together; focusing a first laser radiation emitted from a first laser radiation source in a laser spot into the joining zone of the components so that a material bonding of the two components is achieved in the area of the laser spot of the first laser radiation by heat input; focusing a second laser radiation emitted from a second laser radiation source in at least one laser spot into the joining zone of the components preceding the laser spot of the first laser radiation in a joining direction, so that a joining pretreatment is performed on at least one of the two components in the joining zone (FZ) in the area of the at least one laser spot. The joining method is characterized in that the first laser radiation and the second laser radiation are focused into the joining zone through a common beam path.

According to an exemplary embodiment, a surface pretreatment is carried out on the at least one of the two components in the joining zone by the at least one laser spot of the second laser radiation as joining pretreatment. In particular, ablation and/or melting of a coating on at least one of the two components in the joining zone is performed as surface pretreatment by the at least one laser spot of the second laser radiation.

According to a further exemplary embodiment, the joining method comprises a soldering or welding process that enables the laser-joining of hot-dip galvanized (and otherwise coated materials) by implementing a selective irradiation of the joining zone directly preceding the joining process by utilizing a multi-core fiber, in particular, a three-core fiber. The multi-core fiber containing two, three, or more fiber cores allows the coupling of multiple optical fibers in an optical fiber cable. This makes it possible to image the laser beams originating from multiple laser radiation sources using a single optical system and, thus, to integrate the joining pretreatment, in particular, the ablation and/or melting of the zinc layer, into the soldering or welding process. Because only a single optical system is necessary for both laser radiations, conventional optical systems and systems can still be used following modification according to the exemplary embodiments. Because the surface pretreatment is done inline, no additional workstation is required.

In particular, a multi-core fiber with, for example, three fiber cores serves for guiding multiple (e.g., three) laser beams, which are input into a commercially available optical system by the multi-core fiber. This allows performance of the process adaptation, e.g., for hot-dip galvanized sheet metal, while still using an existing soldering optical system. Multiple laser spots, such as, in particular, three laser spots, from different laser radiation sources are imaged on the components to be joined.

Thus, for example, a trifocal soldering can be realized by combining an inline upstream surface pretreatment and a downstream soldering. Advantageously, the second laser radiation used for surface pretreatment, in particular, for ablation and/or melting of a coating of the components, can be guided on both sides on a solder wire onto the surfaces of the components in the joining zone. The first laser radiation used for material bonding or soldering is subsequently fed to the second laser radiation downstream of the joining zone.

In an exemplary embodiment, a continuously emitting first laser radiation source is used for the material bonding or soldering. For the surface pretreatment or the change in the properties of the surfaces of the components, both a pulsed and a continuously emitting second laser radiation source can be used.

The invention also explicitly encompasses such embodiments, which are not given by feature combinations from explicit back reference of the claims, whereby the disclosed features of the invention can be arbitrarily combined with one another, insofar as this is technically useful.

With the foregoing and other objects in view, there is provided, a joining device for laser radiation-based joining of at least two components at a joining zone comprises a first laser radiation source having a predetermined power configuration and configured to emit first laser radiation, a first radiation guide connected to the first laser radiation source to couple the first laser radiation emitted from the first laser radiation source into the first radiation guide, a second laser radiation source having a predetermined power configuration and configured to emit second laser radiation, at least one second radiation guide connected to the second laser radiation source to couple the second laser radiation emitted from the second laser radiation source into the at least one second radiation guide, a focusing device coupled to the first radiation guide and to the at least one second radiation guide and configured to focus the first and second laser radiations at a distance from each other into the joining zone of the at least two components and to focus the first and second laser radiations through a common beam path, and a coupling device. The coupling device has an input side and an output side, is connected on the input side to the first radiation guide and to the at least one second radiation guide, is connected on the output side to the focusing device, and is configured to couple the first and second laser radiations into the common beam path of the focusing device.

In accordance with another feature, the at least one second radiation guide is at least two second radiation guides each connected to the second laser radiation source to couple the second laser radiation emitted from the second laser radiation source into each of the at least two second radiation guides.

In accordance with a further feature, the first radiation guide has a first radiation outlet, the at least one second radiation guide has at least one second radiation outlet, the coupling device has a multi-core fiber for guiding radiation and having a number of fiber cores corresponding to a sum of a number of the first radiation guide and the at least one second radiation guide, and the fiber cores are respectively coupled to one of the first radiation outlet and the at least one second radiation outlet and the focusing device.

In accordance with an added feature, the first radiation guide has a first radiation outlet, the at least one second radiation guide has at least one second radiation outlet, the coupling device has a multi-core fiber for guiding radiation and having a number of fiber cores corresponding to a sum of a number of the first radiation guide and the at least one second radiation guide, and the fiber cores each have opposing ends one of the opposing ends coupled to one of the first radiation outlet and the at least one second radiation outlet and another of the opposing ends coupled to the focusing device.

In accordance with an additional feature, the first radiation guide has a first radiation outlet, the at least two second radiation guides comprise a first second radiation outlet and a second second radiation outlet, the coupling device has a multi-core fiber for guiding radiation and having a number of fiber cores corresponding to a sum of a number of the first radiation guide and the at least two second radiation guides, and the fiber cores are respectively coupled to one of the first radiation outlet, the first second radiation outlet, and the second second radiation outlet, and to the focusing device.

In accordance with yet another feature, the first radiation guide has a first radiation outlet, the at least two second radiation guides comprise a first second radiation outlet and a second second radiation outlet, the coupling device has a multi-core fiber for guiding radiation and having a number of fiber cores corresponding to a sum of a number of the first radiation guide and the at least two second radiation guides, and the fiber cores each have opposing ends one of the opposing ends coupled to one of the first radiation outlet, the first second radiation outlet, and the second second radiation outlet, and another of the opposing ends coupled to the focusing device.

In accordance with yet a further feature, the power configuration of the first laser radiation source differs from the power configuration of the second laser radiation source.

In accordance with yet an added feature, the power configuration of the first laser radiation source is defined to effect a material bonding of the two components with the focused first laser radiation emitted by the focusing device.

In accordance with yet an additional feature, the power configuration of the second laser radiation source is defined to effect, with the focused second laser radiation emitted by the focusing device, surface pretreatment at at least one of the two components in the joining zone as a joining pretreatment.

In accordance with again another feature, at least one of the two components comprises a coating in the joining zone and the power configuration of the second laser radiation source is defined to effect, with the focused second laser radiation emitted by the focusing device, at least one of ablation and melting of the coating on at least one of the two components in the joining zone as a joining pretreatment.

With the objects in view, there is also provided a method for joining at least two components by laser radiation comprising the steps of disposing the two components with respect to one another to define a joining zone for joining the two components together, focusing a first laser radiation emitted from a first laser radiation source in a laser spot into the joining zone of the two components so that a material bonding of the two components is achieved in an area of the laser spot of the first laser radiation by heat input, and focusing a second laser radiation emitted from a second laser radiation source in at least one laser spot into the joining zone of the two components upstream of the laser spot of the first laser radiation in a joining direction to effect a joining pretreatment on at least one of the two components in the joining zone in an area of the at least one laser spot, the first laser radiation and the second laser radiation being focused into the joining zone through a common beam path.

In accordance with again a further mode, a surface pretreatment is performed as the joining pretreatment on the at least one of the two components in the joining zone by the at least one laser spot of the second laser radiation.

In accordance with a concomitant mode, at least one of the two components comprises a coating in the joining zone, and at least one of ablation and melting of the coating is performed on the at least one of the two components in the joining zone as the surface pretreatment by the at least one laser spot of the second laser radiation.

Although the systems, apparatuses, and methods are illustrated and described herein as embodied in a joining device and joining method, it is, nevertheless, not intended to be limited to the details shown because various modifications and structural changes may be made therein without departing from the spirit of the invention and within the scope and range of equivalents of the claims. Additionally, well-known elements of exemplary embodiments will not be described in detail or will be omitted so as not to obscure the relevant details of the systems, apparatuses, and methods.

Additional advantages and other features characteristic of the systems, apparatuses, and methods will be set forth in the detailed description that follows and may be apparent from the detailed description or may be learned by practice of exemplary embodiments. Still other advantages of the systems, apparatuses, and methods may be realized by any of the instrumentalities, methods, or combinations particularly pointed out in the claims.

Other features that are considered as characteristic for the systems, apparatuses, and methods are set forth in the appended claims. As required, detailed embodiments of the systems, apparatuses, and methods are disclosed herein; however, it is to be understood that the disclosed embodiments are merely exemplary of the systems, apparatuses, and methods, which can be embodied in various forms. Therefore, specific structural and functional details disclosed herein are not to be interpreted as limiting, but merely as a basis for the claims and as a representative basis for teaching one of ordinary skill in the art to variously employ the systems, apparatuses, and methods in virtually any appropriately detailed structure. Further, the terms and phrases used herein are not intended to be limiting; but rather, to provide an understandable description of the systems, apparatuses, and methods. While the specification concludes with claims defining the systems, apparatuses, and methods of the invention that are regarded as novel, it is believed that the systems, apparatuses, and methods will be better understood from a consideration of the following description in conjunction with the drawing figures, in which like reference numerals are carried forward.

BRIEF DESCRIPTION OF THE DRAWINGS

The accompanying figures, where like reference numerals refer to identical or functionally similar elements throughout the separate views, which are not true to scale, and which, together with the detailed description below, are incorporated in and form part of the specification, serve to illustrate further various embodiments and to explain various principles and advantages all in accordance with the systems, apparatuses, and methods. Advantages of embodiments of the systems, apparatuses, and methods will be apparent from the following detailed description of the exemplary embodiments thereof, which description should be considered in conjunction with the accompanying drawings in which.

DETAILED DESCRIPTION OF THE EMBODIMENTS

As required, detailed embodiments of the systems, apparatuses, and methods are disclosed herein; however, it is to be understood that the disclosed embodiments are merely exemplary of the systems, apparatuses, and methods, which can be embodied in various forms. Therefore, specific structural and functional details disclosed herein are not to be interpreted as limiting, but merely as a basis for the claims and as a representative basis for teaching one skilled in the art to variously employ the systems, apparatuses, and methods in virtually any appropriately detailed structure. Further, the terms and phrases used herein are not intended to be limiting; but rather, to provide an understandable description of the systems, apparatuses, and methods. While the specification concludes with claims defining the features of the systems, apparatuses, and methods that are regarded as novel, it is believed that the systems, apparatuses, and methods will be better understood from a consideration of the following description in conjunction with the drawing figures, in which like reference numerals are carried forward.

In the following detailed description, reference is made to the accompanying drawings which form a part hereof, and in which are shown by way of illustration embodiments that may be practiced. It is to be understood that other embodiments may be utilized and structural or logical changes may be made without departing from the scope. Therefore, the following detailed description is not to be taken in a limiting sense, and the scope of embodiments is defined by the appended claims and their equivalents.

Alternate embodiments may be devised without departing from the spirit or the scope of the invention. Additionally, well-known elements of exemplary embodiments of the systems, apparatuses, and methods will not be described in detail or will be omitted so as not to obscure the relevant details of the systems, apparatuses, and methods.

Before the systems, apparatuses, and methods are disclosed and described, it is to be understood that the terminology used herein is for the purpose of describing particular embodiments only and is not intended to be limiting. The terms "comprises," "comprising," or any other variation thereof are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element. The terms "including" and/or "having," as used herein, are defined as comprising (i.e., open language). The terms "a" or "an", as used herein, are defined as one or more than one. The term "plurality," as used herein, is defined as two or more than two. The term "another," as used herein, is defined as at least a second or more. The description may use the terms "embodiment" or "embodiments," which may each refer to one or more of the same or different embodiments.

The terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact (e.g., directly coupled). However, "coupled" may also mean that two or more elements are not in direct contact with each other, but yet still cooperate or interact with each other (e.g., indirectly coupled).

For the purposes of the description, a phrase in the form "A/B" or in the form "A and/or B" or in the form "at least one of A and B" means (A), (B), or (A and B), where A and B are variables indicating a particular object or attribute. When used, this phrase is intended to and is hereby defined as a choice of A or B or both A and B, which is similar to the phrase "and/or". Where more than two variables are present in such a phrase, this phrase is hereby defined as including only one of the variables, any one of the variables, any combination of any of the variables, and all of the variables, for example, a phrase in the form "at least one of A, B, and C" means (A), (B), (C), (A and B), (A and C), (B and C), or (A, B and C).

Relational terms such as first and second, top and bottom, and the like may be used solely to distinguish one entity or action from another entity or action without necessarily requiring or implying any actual such relationship or order between such entities or actions. The description may use perspective-based descriptions such as up/down, back/front, top/bottom, and proximal/distal. Such descriptions are merely used to facilitate the discussion and are not intended to restrict the application of disclosed embodiments. Various operations may be described as multiple discrete operations in turn, in a manner that may be helpful in understanding embodiments; however, the order of description should not be construed to imply that these operations are order dependent.

As used herein, the term "about" or "approximately" applies to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. As used herein, the terms "substantial" and "substantially" means, when comparing various parts to one another, that the parts being compared are equal to or are so close enough in dimension that one skill in the art would consider the same. Substantial and substantially, as used herein, are not limited to a single dimension and specifically include a range of values for those parts being compared. The range of values, both above and below (e.g., "+/−" or greater/lesser or larger/smaller), includes a variance that one skilled in the art would know to be a reasonable tolerance for the parts mentioned.

Herein various embodiments of the systems, apparatuses, and methods are described. In many of the different embodiments, features are similar. Therefore, to avoid redundancy, repetitive description of these similar features may not be made in some circumstances. It shall be understood, however, that description of a first-appearing feature applies to the later described similar feature and each respective description, therefore, is to be incorporated therein without such repetition.

Described now are exemplary embodiments. Referring now to the figures of the drawings in detail and first, particularly to FIGS. 1 to 3, there is shown a first exemplary embodiment of a joining device 1 for the laser beam-based joining of at least two components B1, B2 (see FIG. 3) and a joining method using the joining device 1 according to exemplary embodiments. According to an exemplary embodiment of the joining device 1 described here, the joining device 1 is configured for the laser beam-based soldering of the two components B1, B2.

Figure 3:
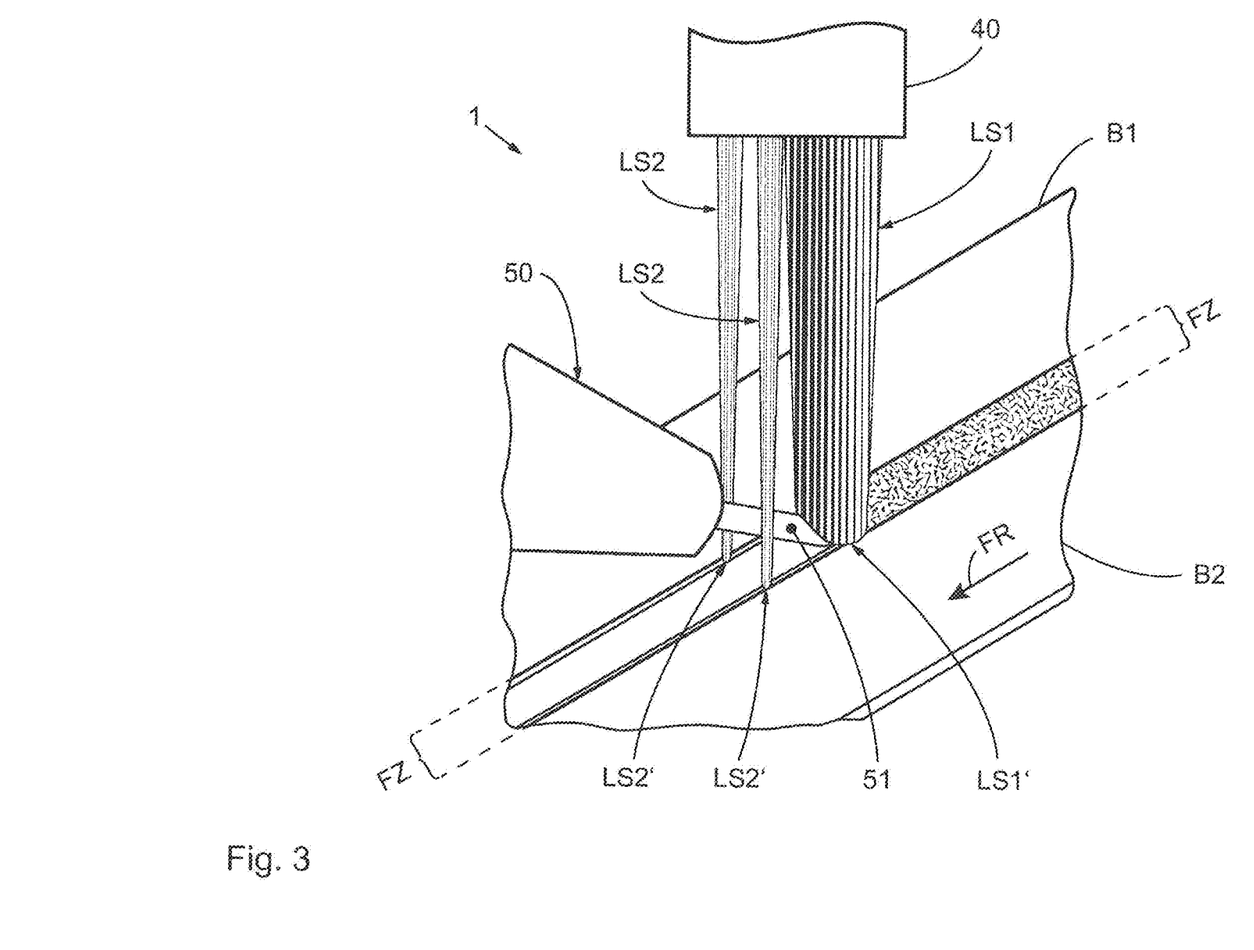
FIG. 3 is a fragmentary, perspective view of a joining zone of two components irradiated with the joining device of FIG. 1.

As shown in FIG. 3, the two components B1, B2 are disposed with respect to one another so that they form a strip-shaped joining zone FZ for joining the components B1, B2. In this case, the joining zone FZ can be formed, for example, of two blunt abutting boundary edges of the two components B1, B2. In addition, the boundary edges of the two components B1, B2 in the joining zone FZ can define a fillet for forming a fillet weld. In the present embodiment, each of the two components B1, B2 is an exterior part for a vehicle body, wherein the two components B1, B2 are all-round hot-dip galvanized for corrosion protection; a zinc coating is applied to each component B1, B2 by hot-dip galvanizing.

Figure 1:
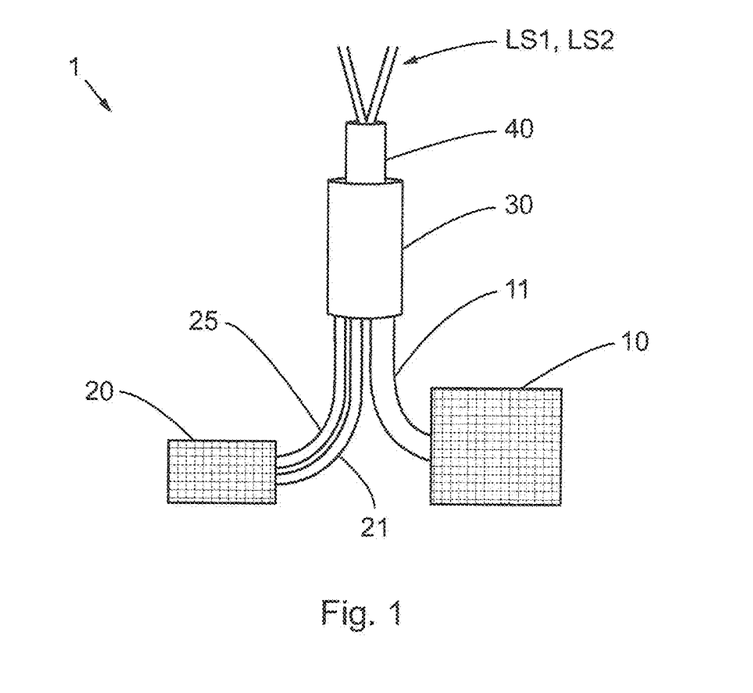
FIG. 1 is a schematic side elevational view of an exemplary embodiment of a joining device.
Figure 2:
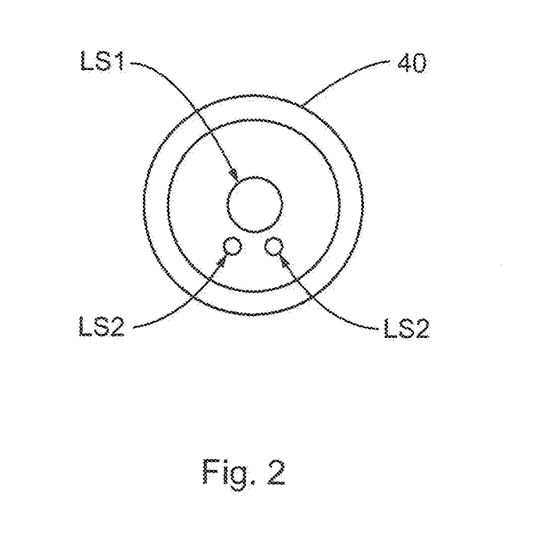
FIG. 2 is a schematic plan view of a focusing device of the joining device of FIG. 1.

As shown in FIGS. 1 to 3, the joining device 1 comprises a first laser radiation source 10, a first radiation guide 11, a second laser radiation source 20, a pair of second radiation guides 21, 25, coupling device 30, a focusing device 40, and additional material feeding device 50 for feeding a solder wire 51 and an inert gas (not shown) into the joining zone FZ.

The first radiation guide 11 is connected to the first laser radiation source 10 to couple first laser radiation LS1 emitted from the first laser radiation source 10 into the first radiation guide 11. The two second radiation guides 21, 25 are respectively connected to the second laser radiation source 20 to couple second laser radiation LS2 emitted from the second laser radiation source 20 into each of the two second radiation guides 21 25. The first and second radiation guides 11, 21, 25 are formed, for example, as separate optical fibers.

The coupling device 30 is connected on an input side to respective radiation outlets (not separately indicated) of the first and second radiation guides 11, 21, 25 and is connected on an output side to the focusing device 40 to introduce the first and second laser radiations LS1, LS2 into the focusing device 40.

The focusing device 40, which is coupled to the respective radiation outlets of the first and second radiation guides 11, 21, 25 through the coupling device 30, comprises an optical system (not separately indicated) for focusing the first and second laser radiations LS1, LS2. The optical system of the focusing device 40 defines a single beam path, by which the first and second laser radiations LS1, LS2 can be jointly guided and thereby focused with multiple spaced-apart foci into the joining zone FZ of the two components B1, B2.

The coupling device 30 has a multi-core fiber (not separately indicated) with fiber cores (not separately indicated), which extend parallel to one another and the number of which corresponds to the sum of first and second radiation guides 11, 21, 25, for guiding radiation. In other words, in the multi-core fiber, the first and second radiation guides 11, 21, 25 (optical fibers) are coupled in a common optical fiber cable (the multi-core fiber). The fiber cores of the multi-core fiber, on one hand, are coupled respectively to one of the radiation outlets of the first and second radiation guides 11, 21, 25 and, on the other hand, are coupled respectively to the focusing device 40. As a result, the coupling device 30 is configured to couple the first and second laser radiations LS1, LS2 into a common beam path of the optical system of the focusing device 40.

A predetermined power configuration of the first laser radiation source 10 and a predetermined power configuration of the second laser radiation source 20 are defined to be different from one another. In the exemplary embodiment of the joining device 1 described here, a laser beam power of the first laser radiation source 10 is greater than a laser beam power of the second laser radiation source 20.

More specifically, the power configuration of the first laser radiation source 10 is defined to effect material bonding of the two components B1, B2 with the focused first laser radiation LS1 by heat input. In other words, the first laser radiation source 10 functions as joining radiation source, by which the solder wire 51 fed by the additional material feeding device 50 is melted when the two components B1, B2 are joined together, and the boundary edges of the two components B1, B2 located in the joining zone FZ are heated at least in the melting zone of the solder wire 51 up to the soldering temperature.

The power configuration of the second laser radiation source 20 is defined, however, to effect surface pretreatment with the focused second laser radiation LS2 at the two components B1, B2 in the joining zone FZ as a joining pretreatment. In the exemplary embodiment of the joining device 1 described here, the power configuration of the second laser radiation source 20 is defined to effect ablation and/or melting of the zinc coating applied respectively to the components B1, B2 by hot-dip galvanizing in the joining FZ as surface pretreatment.

In the following text, a joining method using the joining device 1 for laser radiation joining of the two components B1, B2 is described with reference to the above description of the structure of the joining device 1.

According to the joining method, the two components are first disposed at a mounting location of the joining device 1 such that they define the strip-shaped joining zone FZ for joining the components B1, B2, as shown in FIG. 3. Then, the additional material feeding device 50 for feeding the solder wire 51 and the inert gas is placed at an angle to the joining zone FZ.

In addition, the first and second laser radiation sources 10, 20 are aligned with the joining zone FZ and put into operation. The first laser radiation LS1 and the second laser radiation LS2 are focused into the joining zone FZ through the common beam path of the optical system of the focusing device 40.

More specifically, the first laser radiation LS1 emitted from the first laser radiation source 10 is focused in a laser spot LS1' (which has a diameter of about 3.2 mm, for example) in the middle of the width of the strip-shaped joining zone FZ of components B1, B2, so that in the area of the laser spot LS1' of the first laser radiation LS1 material bonding of the two components B1, B2 is achieved by heat input. For this purpose, the solder wire 51 fed by the additional material feeding device 50 is melted in the area of the laser spot LS1' of the first laser radiation LS1 and the boundary edges of the two components B1, B2 are heated up to the soldering temperature.

The second laser radiation LS2 emitted by the second laser radiation source 20 is focused in two laser spots LS2' at a distance from one another into the joining zone FZ of the components B1, B2, in a joining direction FR preceding or upstream of the laser spot LS1' of the first laser radiation LS1 at a predetermined distance, in the region of the two laser spots LS2' of the second laser radiation LS2, so that the surface pretreatment as joining pretreatment is performed on the two components B1, B2 in the area of the two laser spots LS2' of the second laser radiation LS2 in the joining zone FZ. Within the scope of the surface pretreatment, the zinc coating on the two components B1, B2 is ablated in the joining zone FZ by the two laser spots LS2' of the second laser radiation LS2, which have a diameter that is reduced in comparison to the diameter of the downstream laser spot LS1'.

Thus, so to speak, a trifocal soldering is realized with the combination of an inline upstream surface pretreatment and a downstream soldering. As shown in FIG. 3, the second laser radiation LS2 used for surface pretreatment, in particular, for ablation and/or melting of the zinc coating, is guided on both sides of the solder wire 51 onto the surfaces of the components B1, B2 in the joining zone FZ. The first laser radiation LS1 used for material bonding, e.g., soldering, is fed to the joining zone FZ downstream to the second laser radiation LS2.

A continuously emitting first laser radiation source 10 is used for the material bonding or soldering. Both a pulsed and a continuously emitting second laser radiation source 20 can be used for the surface pretreatment or the change in the properties of the surfaces of the components B1, B2.

The joining device and joining process allow for a more reliable laser joining, in particular, laser soldering, of coated or hot-dip galvanized components (in particular, sheet metals). In conventional solutions, for example, in laser soldering of hot-dip galvanized components, a narrowing of the process window and the formation of characteristic defects, for example, a wavy edge connection of the soldering seam of the joining zone FZ were observed. The solution according to the exemplary embodiments, in which the wetting of the components B1, B2 with the solder of the solder wire 51 is preceded by an irradiation of the component surface, makes it possible to change the surface properties of the components B1, B2.

In particular, melting and/or selective ablating of the coating (in particular, zinc coating surface) in the area of the joining zone FZ is made possible by the exemplary embodiments herein. The inline joining pretreatment, which directly precedes a joining process, increases the esthetically pleasing quality of the resulting joining seam. In addition, as a result of the heat introduced precedingly into the components B1, B2, a higher filling volume of solder and a greater bonding length of the solder on the components B1, B2 are also achieved during soldering. Finally, the sensitivity of a laser-based joining process towards disturbance variables such as, for example, fluctuations in the laser power or a component oiling is reduced, enabling reliable laser-based joining of hot-dip galvanized or otherwise coated components.

LIST OF REFERENCE NUMERALS

1 Joining device
10 first laser radiation source
11 first radiation guide
20 second laser radiation source
21 second radiation guide
25 second radiation guide
30 coupling device
40 focusing device
50 additional material feeding device
51 solder wire
B1 component
B2 component
FR joining direction
FZ joining zone
LS1 first laser radiation
LS1' laser spot
LS2 second laser radiation
LS2' laser spot It is noted that various individual features of the inventive processes and systems may be described only in one exemplary embodiment herein. The particular choice for description herein with regard to a single exemplary embodiment is not to be taken as a limitation that the particular feature is only applicable to the embodiment in which it is described. All features described herein are equally applicable to, additive, or interchangeable with any or all of the other exemplary embodiments described herein and in any combination or grouping or arrangement. In particular, use of a single reference numeral herein to illustrate, define, or describe a particular feature does not mean that the feature cannot be associated or equated to another feature in another drawing figure or description. Further, where two or more reference numerals are used in the figures or in the drawings, this should not be construed as being limited to only those embodiments or features, they are equally applicable to similar features or not a reference numeral is used or another reference numeral is omitted.

The foregoing description and accompanying drawings illustrate the principles, exemplary embodiments, and modes of operation of the systems, apparatuses, and methods. However, the systems, apparatuses, and methods should not be construed as being limited to the particular embodiments discussed above. Additional variations of the embodiments discussed above will be appreciated by those skilled in the art and the above-described embodiments should be regarded as illustrative rather than restrictive. Accordingly, it should be appreciated that variations to those embodiments can be made by those skilled in the art without departing from the scope of the systems, apparatuses, and methods as defined by the following claims.

What is claimed is:

1. A method for joining two components by laser radiation, the two components disposed with respect to one another to define a joining zone for joining the two components together, the method comprising:
    delivering a laser spot of a first laser radiation into the joining zone of the two components so that a material bonding of the two components is achieved in an area of the laser spot of the first laser radiation by heat input;
    delivering at least one laser spot of a second laser radiation into the joining zone of the two components upstream of the laser spot of the first laser radiation in a joining direction to effect a joining pretreatment on at least one of the two components in the joining zone in an area of the at least one laser spot; and
    prior to delivering the laser spot of the first laser radiation and the at least one laser spot of the second laser radiation, guiding the first laser radiation and the second laser radiation through a coupling device having a multi-core fiber for guiding the first laser radiation and the second laser radiation.

2. The method of claim 1, wherein the first laser radiation is emitted from a first laser radiation source and the second laser radiation is emitted from a second laser radiation source, the method further comprising:
    guiding the first laser radiation emitted from the first laser radiation source in a first radiation guide to an input side of the coupling device; and
    guiding the second laser radiation emitted from the second laser radiation source in at least one second radiation guide to an input side of the coupling device.

3. The method of claim 2, wherein the multi-core fiber of the coupling device has a number of fiber cores corresponding to a sum of a number of the first radiation guide and the at least one second radiation guide, and the coupling device is configured such that the fiber cores extend parallel to one another.

4. The method of claim 3, wherein the first radiation guide has a first radiation outlet and the at least one second radiation guide has a second radiation outlet, further comprising:
    focusing first laser radiation emitted from the coupling device into the laser spot; and
    focusing second laser radiation emitted from the coupling device into the at least one laser spot, wherein the fiber cores are configured to be respectively coupled to:
        one of the first radiation outlet and the at least one second radiation outlet, and
        a focusing device that configured to perform the focusing of the first and second laser radiation and configured such that the focusing device focuses each of the first and second laser radiations at a distance from each other into the joining zone of the two components.

5. The method of claim 2, further comprising providing at least one of the first laser radiation source and the second laser radiation source.

6. The method of claim 5, wherein the power configuration of the second laser radiation source is configured to be different from the power configuration of the first laser radiation source.

7. The method of claim 2, further comprising providing at least one of the first radiation guide and the at least one second radiation guide.

8. The method of claim 2, further comprising generating the first laser radiation with the first laser radiation source and generating the second laser radiation with the second laser radiation source.

9. The method of claim 1, further comprising performing a surface pretreatment as the joining pretreatment on the at least one of the two components in the joining zone by the at least one laser spot of the second laser radiation.

10. The method of claim 9, wherein at least one of the two components comprises a coating in the joining zone, and which further comprises performing at least one of ablation and melting of the coating on the at least one of the two components in the joining zone as the surface pretreatment by the at least one laser spot of the second laser radiation.

11. The method of claim 1, further comprising providing the multi-core fiber of the coupling device.

* * * * *